United States Patent

[11] 3,562,638

| [72] | Inventor | Andre M. Renard<br>Penllyn, Pa. |
|---|---|---|
| [21] | Appl. No. | 776,623 |
| [22] | Filed | Nov. 18, 1968 |
| [45] | Patented | Feb. 9, 1971 |
| [73] | Assignee | Honeywell Inc.<br>Minneapolis, Minn.<br>a corporation of Delaware |

[54] THIN FILM MAGNETOMETER USING MAGNETIC VECTOR ROTATION
2 Claims, 3 Drawing Figs.

| [52] | U.S. Cl. | 324/43 |
|---|---|---|
| [51] | Int. Cl. | G01r 33/02 |
| [50] | Field of Search | 324/34, 43 |

[56] References Cited
UNITED STATES PATENTS

| 3,239,754 | 3/1966 | Odom, Jr. et al. | 324/47 |
| 3,400,328 | 9/1968 | Penn et al. | 324/43 |
| 3,416,072 | 12/1968 | Fussell et al. | 324/43 |

FOREIGN PATENTS

| 995,307 | 6/1965 | Great Britain | 324/43 |

*Primary Examiner*—Alfred E. Smith
*Attorneys*—Charles J. Ungemach, Ronald T. Reiling, Robert E. Walrath and Bruce C. Lutz

ABSTRACT: A thin magnetic film magnetometer is disclosed wherein the magnetometer has an easy axis drive component. The component of the ambient DC magnetic field in the direction of the hard axis rotates the magnetic vector of the thin film away from the easy axis. A drive rotates the vector away from its rest position with the rotation of the vector being modulated by the magnetic signal field being sensed. A sensing coil picks up output pulses in response to the disturbance of the magnetic vector which are modulated in accordance with the magnetic signal field. An electrical signal representative of the magnetic signal is obtained by demodulating or detecting the output signals of the sensing coil.

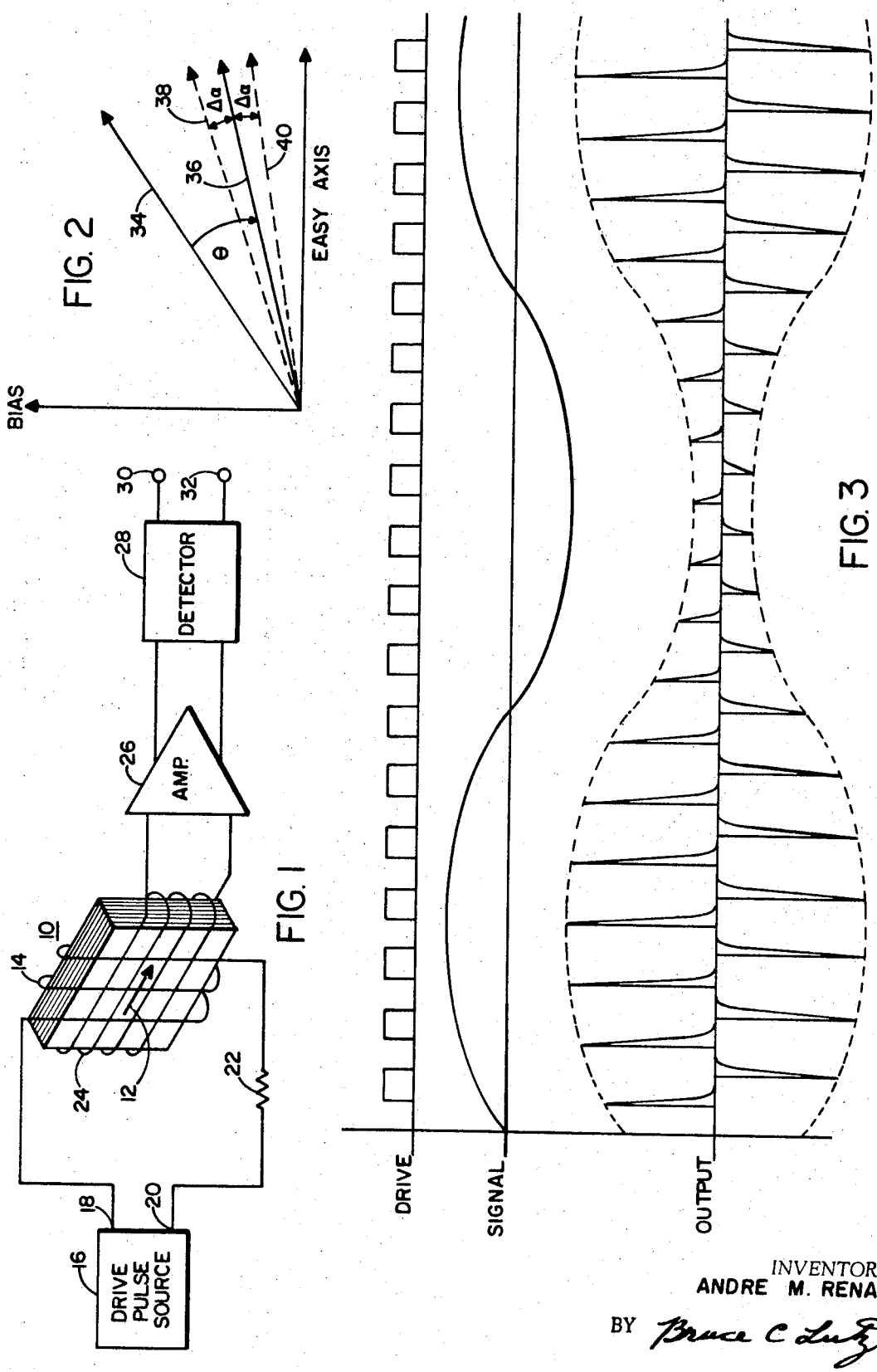

THIN FILM MAGNETOMETER USING MAGNETIC VECTOR ROTATION

BACKGROUND OF THE INVENTION

Magnetic detectors or magnetometers are well known in the prior art and have been used in a large variety of applications. Magnetometers can be used to detect magnetic fields per se and can also be used to detect objects which disturb an ambient magnetic field. For example, metallic objects may disturb the ambient magnetic field and their presence or absence can be detected by detecting the disturbance of the field. Some examples of applications of magnetic detectors and magnetometers for object detection are detecting objects in a production line or similar line, vehicle detection, and mine detection.

The four of types of thin film magnetometers to which this invention is most closely related are the resonant L-C thin film magnetometer, the AC pump thin film magnetometer, the demagnetized thin film magnetometer, and the switched thin film magnetometer. Each of these prior art magnetometers has various disadvantages which this invention overcomes. The prior art thin film magnetometers generally use hard axis drive while this invention uses easy axis drive.

The resonant L-C thin film magnetometer uses the thin film as an inductance varying device in a resonant L-C circuit which is driven by a radio frequency oscillator. The magnetic input signal is detected in the output signal voltage from the L-C circuit. In this type of magnetometer, a change in the oscillator frequency has the same effect as a change in the magnetic signal so that the oscillator must be crystal controlled. A lower oscillator frequency will increase stability, but it will reduce the sensitivity of the magnetometer below acceptable levels. Thus, it can be used to detect low frequency magnetic signals only if an extremely stable oscillator is used. This magnetometer also is sensitive to the earth's magnetic field. It is further characterized by sensitivity to temperature changes, low resistance to mechanical shock, high cost, and large physical size.

The AC pump thin film magnetometer uses an AC drive or pump that produces a magnetic field intensity in the hard direction of the thin film which causes the magnetic vector of the film to pump at the frequency of the drive signal. A signal in the direction of the easy axis induces a voltage in the sensing coil. The main disadvantages of this type of magnetometer is that the input drive power is inherently high and the sensitivity at low gamma levels is very low so that low level magnetic signals cannot be detected.

The demagnetized thin film magnetometer uses a demagnetizing field at radio frequencies in the hard direction. The net flux crossing the sensing coil, which is oriented to detect signals in the direction of the easy axis, is zero during the cycle of magnetization-demagnetization. A signal in the direction of the easy axis induces a voltage in the sensing coil which can be detected with a phase and envelope detector. This type of magnetometer requires high power both to operate the sensor element and to operate the associated electronics. Furthermore, it requires a large volume and is relatively expensive. It is also sensitive to temperature changes and is not resistant to mechanical shock. The most serious deficiency of this type of magnetometer, however, is the inherent instability of demagnetization in the presence of extraneous fields such as the earth's magnetic feild.

The switched thin film magnetometer is exemplified by P. S. Castro et al. 3,271,665. In Castro et al. the thin film is switched about the easy axis. This magnetometer has the disadvantage of requiring high power to switch the film. It also requires extremely high frequencies to achieve high sensitivity.

BRIEF DESCRIPTION OF THE INVENTION

This invention overcomes most of the deficiencies of the prior art. A magnetometer constructed according to this invention has a low relative power consumption, has a high sensitivity to low level magnetic signals, can be used to detect very low frequency magnetic signals, is not affected by variations in the drive frequency, it is not disturbed by input signal frequency variations, and operates properly in the presence of the earth's magnetic field. In fact, a magnetometer constructed in accordance with this invention may use the earth's magnetic field to aid in its operation. Furthermore, a magnetometer constructed in accordance with this invention is inexpensive, small, insensitive to temperature changes, and resistant to mechanical shock.

A magnetometer constructed in accordance with this invention has a thin film sensor element having an easy axis and has a drive winding associated therewith oriented to provide a component of magnetic field in the direction of the easy axis of the film. A sense winding is oriented orthogonal to the drive winding and picks up disturbance of the magnetic vector in the direction of the hard axis. Any ambient DC field in the direction of the hard axis rotates the magnetic vector away from the easy axis. This ambient DC field can be the earth's magnetic field or any similar ambient field. Pulses of current applied to the drive winding rotate the magnetic vector from its rest position. When each drive pulse ends, the magnetic vector rotates back to its rest position. The rotation of the magnetic vector is modulated by the signal magnetic field which varies the angle through which the magnetic vector is rotated in response to the drive signal. The sense winding picks up the disturbance of the magnetic vector and provides an output signal amplitude modulated in accordance with the magnetic signal. The signal induced in the sense winding is demodulated or detected to provide an electrical signal representative of the magnetic signal.

The thin film sensor element itself is sensitive to the earth's magnetic field; however, the earth's magnetic field and other stray DC fields can be used to enhance the operation of the sensor. These DC magnetic field signals are not reflected in the output signal of the magnetometer system. Depending upon the construction of the sensor element, a DC field may not be necessary for the operation of the device.

Accordingly, it is an object of this invention to provide a new and useful magnetic device useful as a magnetometer to detect magnetic fields and disturbances thereof.

This object and other objects and advantages of this invention will be apparent to those skilled in the art upon a reading of this specification and appended claims in conjunction with the drawings, of which:

FIG. 1 is a schematic and block diagram of the invention;

FIG. 2. is a vector diagram to aid in the explanation of the operation of FIG. 1; and FIG. 3 is a graph showing signal waveforms to aid the explanation of the invention.

DETAILED DESCRIPTION OF THE PREFERRED EMBODIMENT

The preferred embodiment of this invention is illustrated in FIG. 1. The sensor element 10 is a thin magnetic film having a preferred direction of magnetization or easy axis represented by arrow 12. The hard axis is perpendicular to the easy axis in the plane of the film. The easy and hard axis of a thin magnetic film are defined during the manufacture of the film and the preferred direction of magnetization of the film is along the easy axis. The thin magnetic film 10 may be a single film or a plurality of films stacked together. A plurality of films increases the sensitivity of the sensor. As many films as desired can be stacked. In one successful embodiment of this invention, ten films of approximately 500 angstroms each were used although the number of films and the thickness of each film can be varied within broad limits. The optimum thickness of each film and the optimum number of films depends somewhat upon the application to which the device is being put.

A drive means, winding, or coil 14 is associated with or wound around the thin film sensor element 10. The axis of winding 14 is oriented generally or substantially parallel to the easy axis of the film. Successful embodiments of this invention have been made using drive windings with the number of turns varying between 200 and 500 turns. The number of turns, however, is not limited to the above range and can be any reasonable number desired. A signal generator, input signal source, or drive pulse source 16 has a first output terminal 18 connected to one end of winding 14 and a second output terminal 20 connected by means of a resistor 22 to the opposite end of winding 14.

A sense means, winding, or coil 24 is associated with or wound around the thin magnetic film sensor element 10 with its axis oriented substantially parallel to the hard axis of the film. In one practical embodiment winding 24 had approximately 100 turns per centimeter, but the number of turns may vary over broad ranges. The one embodiment referred to had a total of about 145 turns. Sense winding 24 is substantially orthogonal to drive winding 14. The output terminals of winding 24 are connected to first and second inputs of a differential amplifier 26 which has its output connected to a detector or demodulator 28. Detector 28 has output terminals 30 and 32.

To understand the operation of this invention, assume that the thin magnetic film material in sensor element 10 is magnetized along the easy axis in the direction of the arrow 12. Assume also that there are stray DC fields, such as the earth's magnetic field, which have a component in the direction of the hard axis. The stray fields cause the magnetic vector to rotate from the easy axis to a position represented by vector 34 in FIG. 2. Vector position 34 is denoted as the rest position since this position is where the magnetic vector comes to rest when the ambient DC field is applied. Note that this rest position varies depending upon the strength of the ambient DC magnetic field in the direction of the hard axis (the axis labeled BIAS in FIG. 2) and accordingly depends upon the orientation of sensor element 10 with respect to the ambient field. In the absence of a magnetic field due to a magnetic signal, the drive signal applied to winding 14 rotates the magnetic vector from the rest position 34 through an angle $\theta$ to a position represented by vector 36 of FIG. 2. Each time a drive pulse is applied to winding 14, the magnetic vector rotates from position 34 to position 36 when the leading edge of the pulse occurs and rotates back to position 34 when the pulse ends. When a constant amplitude drive source is used, the magnetic vector oscillates between positions 34 and 36.

Assume that some type of external magnetic signal is sensed by sensor element 10. Further assume that a signal with the waveform labeled DRIVE in FIG. 3 is applied to winding 14 and that the magnetic signal has a waveform represented by the waveform labeled SIGNAL in FIG. 3. When the leading edge of each drive pulse occurs, the magnetic vector rotates from position 34 to position 36. The position of vectors 34 and 36, however, is modulated by the magnetic signal so that vector position 36 varies through an angle $\pm\Delta$ which is defined by vector positions 38 and 40 shown in dotted lines. This modulating action essentially modulates the angle $\theta$ and the length of the magnetic vector thereby modulating the component of the magnetic vector in the direction of the hard axis. Since the signal induced in winding 24 depends upon the variation of the magnetic vector in the direction of the hard axis, the induced signal is also modulated as shown by the waveform labeled OUTPUT in FIG. 3. This waveform is representative of the type of signal induced in winding 24 in response to the drive signal and external magnetic field.

The output signal induced in winding 24 is essentially a pulse amplitude modulated signal with the envelope corresponding to the magnetic signal being detected by the sensor. When a leading edge of the drive signal occurs, a positive output pulse is induced in the sense winding and when the trailing edge of the drive pulse occurs, a negative signal is induced. Thus, the positive output pulses correspond to the rotation of the magnetic vector from position 34 to position 36 and the negative output pulses correspond to the rotation of the magnetic vector back to rest position 34. In FIG. 3, the drive pulses are shown as being perfectly square which in physical reality is not correct and is not necessary. Also, the shape of the output pulses, while approximately the shape to be expected, is not necessarily the exact pulse shape which occurs in all embodiments and in all applications.

The output signal from sense winding 24 is coupled to amplifier 26 where it is amplified and applied to detector 28 via a pulse transformer. Detector 28 may be any suitable envelope detector such as a diode detector and low pass filter a or an equivalent detector. For example, a low pass integrating amplifier may be used.

In the embodiment shown in FIG. 1, the thin film is shown as being magnetized along the easy axis in the direction of arrow 12. The direction of winding of drive winding 14 is shown such that the drive pulses will induce a magnetic field in approximately the same direction as the magnetization of the thin film when terminal 18 is positive with respect to terminal 20. It has been discovered, however, that it is preferable to drive terminal 20 positive with respect to terminal 18 so that the induced field is parallel to the easy axis but in the opposite direction to the magnetization of the film. It has been found that the amount of rotation of the magnetic vector or the magnitude of angle $\theta$ is greater, and hence the output signal is greater, when the drive field is in the direction opposite to the magnetization of the film. However, the invention operates properly and satisfactorily if the drive field is in the same direction as the magnetization. In either case, the drive field has a component along or parallel to the easy axis.

While I have shown and described only one embodiment in my invention, many modifications and variations of my invention will be evident to those skilled in the art.

I claim:

1. A magnetometer for giving an output representative of the component of a magnetic field in a predetermined direction, comprising, in combination:
   a thin film of anisotropic material, containing first and second mutually perpendicular axes for alignment respectively parallel and normal to the predetermined direction of said component, said second axis coinciding with the preferred direction of magnetization of said film;
   a first winding encompassing said material and having its axis aligned with the preferred direction of magnetization of said material;
   driving means electrically energizing said first winding with uniform pulses of electrical current to produce an intermittent magnetic field in said material which combines with said component to cause angular oscillation of the magnetic vector of said material, the amplitude of said pulses being such that the magnitude of the combined field is always insufficient to cause reversal of the direction of magnetization of said material;
   a second winding encompassing said material, and positioned to be insensitive to pulses of current in said first winding, so that said angular oscillation of said magnetic vector induces pulses of current in said second winding; and
   output means connected to said second winding for actuation in accordance with the amplitude of said pulses of current, so that when said magnetometer is positioned in a magnetic field to be measured, the output means is activated in accordance with said component of the field.

2. A magnetometer as defined in claim 1 wherein said thin film magnetic material includes a plurality of thin films in juxtaposition with each other.